United States Patent [19]

Komma et al.

[11] Patent Number: 5,502,707
[45] Date of Patent: Mar. 26, 1996

[54] DIFFRACTION GRATING AND OPTICAL PICKUP APPARATUS WITH DIFFRACTING GRATING

[75] Inventors: Yoshiaki Komma, Kyoto; Seiji Nishino, Osaka, both of Japan

[73] Assignee: Matsushita Electric Industrial Co., Ltd., Osaka, Japan

[21] Appl. No.: 339,714

[22] Filed: Nov. 14, 1994

Related U.S. Application Data

[62] Division of Ser. No. 19,537, Feb. 18, 1993, Pat. No. 5,400,311.

[30] Foreign Application Priority Data

Feb. 21, 1992 [JP] Japan ................................. 4-034657

[51] Int. Cl.$^6$ ................................. G11B 7/00; G02B 5/18
[52] U.S. Cl. ................ 369/103; 369/109; 369/112; 359/572; 359/573; 359/575
[58] Field of Search ................................. 369/103, 109, 369/112; 359/573, 572, 571, 575

[56] References Cited

U.S. PATENT DOCUMENTS 5,111,448 5/1992 Komma et al. ................. 369/112
5,113,067 5/1992 Nakai et al. ................... 359/571
5,221,835 6/1993 Setani ........................ 359/571
5,227,915 7/1993 Grossinger et al. ............. 359/575

FOREIGN PATENT DOCUMENTS 63-191328 8/1988 Japan .
2185722 7/1990 Japan .
4212730 8/1992 Japan .

*Primary Examiner*—Georgia Y. Epps
*Assistant Examiner*—Kim-Kwok Chu
*Attorney, Agent, or Firm*—Lowe, Price, LeBlanc & Becker

[57] ABSTRACT

An optical pickup apparatus in which light from a light source is led to an information medium and reflected light from the information medium is led to a hologram to be incident as a +1st order diffraction beam on a photodetector to obtain information signals. The hologram has a stair-like cross-sectional configuration, and a ratio of the width of a step of the stair-like cross-sectional configuration relative to a grating pitch of the hologram is arranged to vary in accordance with a position within a surface of the hologram.

11 Claims, 10 Drawing Sheets

FIG. 13 PRIOR ART
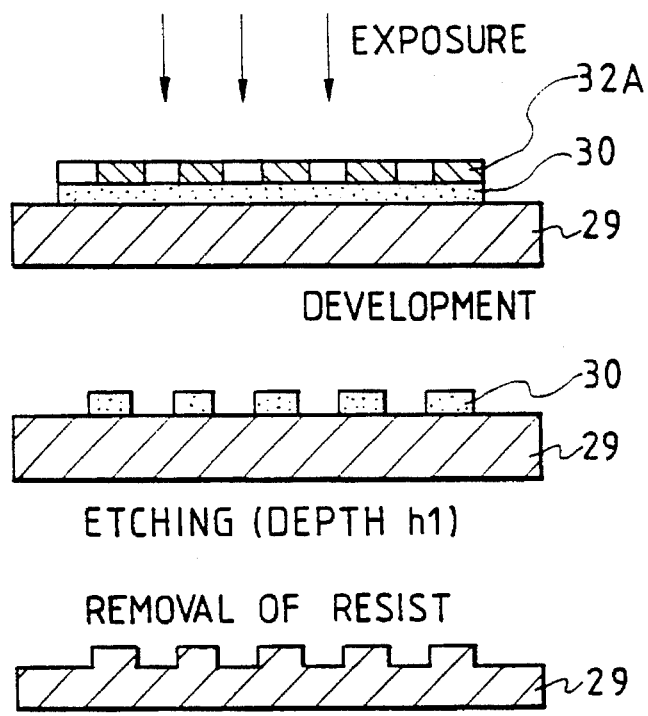
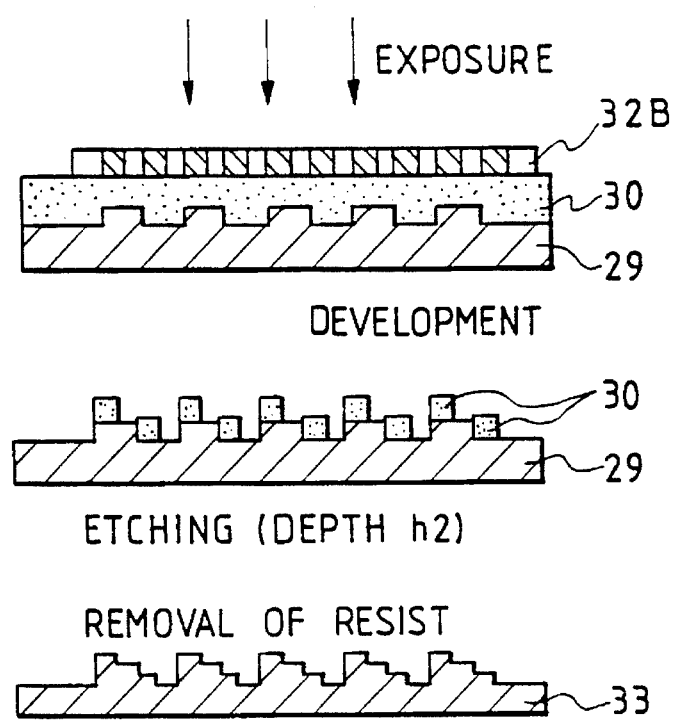

DIFFRACTION GRATING AND OPTICAL PICKUP APPARATUS WITH DIFFRACTING GRATING

This application is a division of application Ser. No. 08/019,537 filed Feb. 18, 1993, now U.S. Pat. No. 5,400,311, issued on Mar. 21, 1995.

BACKGROUND OF THE INVENTION

The present invention relates to a hologram (diffraction grating) and an optical system using such a hologram as a key device.

Recently, the optical storage using an optical disk is being widely used as a high-density and large-capacity recording medium. The reliability or such an optical storage greatly depends upon its optical system used. An optical pickup head apparatus, being a main device of such an optical system is constructed with a hologram for the size-reduction purposes.

FIG. 12 shows an arrangement of an prior art optical pickup apparatus as described in the Japanese Patent provisional Publication No. 4-212730 (the same applicant as this application). In FIG. 12, a light beam 3 emitted from a light source such as a semiconductor laser 2 is reflected on a reflection type blazed hologram (which will be referred hereinafter to as a hologram) 105 so as to be incident on an objective lens 4 and then focused on an information medium (recording medium) 5. Light reflected from the information medium 5 advances along the same optical path (return optical path) to arrive at the hologram 105. The +1st order diffraction beam 6 due to the hologram 105 in the return optical path is incident on a photodetector 7, thereby obtaining a servo signal and an information signal by the calculation of the output of the photodetector 7. Numeral 61 designates the 0 order diffraction beam in the outward optical path. Here, the hologram 105 is blazed in order to prevent that unnecessary diffraction light due to the hologram 105 in the outward optical path from the light source 2 to the information medium 5 is reflected on the information medium 5 to be incident on the photodetector 7. The blazed hologram 105 may be manufactured as illustrated in FIG. 13 where 29 denotes a hologram base plate, 30 represents a resist, 32A, 32B designate photomasks, 33 depicts a blazed hologram, and h1, h2 represent etching depths. That is a series of processes including exposure, development removal of resist and etching are effected two times to form a multi-level hologram having a stair-like configuration in the cross section as illustrated in FIG. 14 where a7=b7=c7=d7. This arrangement can improve the degree of freedom for control of the diffraction efficiency. That is, the first etching depth h1 and the second etching depth h2 are controlled independently of each other so as to increase the light utilization efficiency in the outward and return optical paths concurrently with decreasing the diffraction efficiency of the unnecessary diffraction beam.

The aforementioned blazed hologram 105 also acts as a mirror to bend the optical axis and hence it is possible that an optical pickup head apparatus can be constructed with a small number of parts, and further the above-described arrangement can omit a collimator lens, thus reducing the size, weight and cost of the optical pickup head apparatus.

However, the incident angles of light are different between portions indicated at characters A and E in FIG. 12, and hence a difference in the diffraction efficiency of the diffraction beam due to hologram 105 occurs. Here, the reason of the occurrence of the difference in the diffraction efficiency of the diffraction beam due to a reflection type hologram will be described hereinbelow with reference to FIG. 15. In FIG. 15, references 65a, 65b are incident light beams on the hologram, 66a, 66b represent diffraction beams, θ1 denotes an incident angle, θ2 depicts a diffraction angle, 33a, 33b designate the upper and lower side reflecting surfaces of a relief and reflection type blazed hologram, h represents a difference between the upper and lower side reflecting surfaces of the relief and reflection type blazed hologram, and L1, L2 are optical path differences due to the difference h. At this time, the optical path differences becomes L1=h.cos θ1 and L2=h.cos θ2. As obvious from these equations, the optical path differences are respectively proportional to the cosine of the incident angle θ1 and the cosine of the diffraction angle θ2, and hence, when the incident angle θ1 and diffraction angle θ2 are set to 45°, the optical path differences sharply vary in response to variations of the incident angle θ1 and diffraction angle θ2 whereby the diffraction efficiency varies. In the above-described conventional optical pickup head apparatus, a servo signal offset generates in response to the variation of the diffraction efficiency or the frequency characteristic of the RF signal deteriorates.

SUMMARY OF THE INVENTION

It is therefore an object of the present invention to provide a hologram and optical apparatus which is capable of eliminating the variation of the diffraction efficiency.

A hologram according to this invention has a stair-like cross-sectional configuration so that a ratio of the width of a step of the stair-like cross-sectional configuration relative to a grating pitch of the hologram varies in accordance with a position within a surface of the hologram. More specifically, a first end portion of the hologram corresponding to a portion of a peripheral portion of an incident light beam on the hologram at which the incident angle is the greatest, is arranged such that, when the widths of first to fourth steps in the first end portion are respectively taken to be a2, b2, b1 and a1, a relation between the step widths is arranged to satisfy a1=a2>b1=b2. The step position heightens in order of the first to fourth steps respectively having the widths a2, b2, b1 and a1, and the second and third steps having the widths b2 and b1 exist between the first and fourth steps having the widths a2 and a1. Further, a second end portion of the hologram corresponding to a portion of the peripheral portion of the incident light beam on the hologram and taking the smallest incident angle is arranged such that, when the widths of first to fourth steps in the second end portion are taken to be a4, b4, b3 and a3, a relation between the step widths is arranged to satisfy a3=a4<b3=b4. The step position similarly heightens in order of the first to fourth steps respectively having the widths a4, b4, b3 and a3, and the second and third steps having the widths b4 and b3 exist between the first and fourth steps having the widths a4 and a3. The intermediate portion of the hologram between the first and second end portions is arranged such that the widths of the steps are arranged to be substantially equal to each other.

In addition, according to this invention, there is provided an optical pickup apparatus in which light from a light source is led to an information medium and reflected light from the information medium is led to a hologram to be incident as a +1st order diffraction beam on a photodetector to obtain information signals, the hologram having a stair-like cross-sectional configuration, and a ratio of the width of a step of the stair-like cross-sectional configuration relative to a grating pitch of the hologram varying in accordance with a position within a surface of the hologram. More specifically, a first end portion of the hologram corresponding to a portion of a peripheral portion of an incident light beam on the hologram, at which the incident angle on the hologram is the largest, that is, where the light is incident on the hologram at the largest angle, is arranged such that, when the widths of first to fourth steps in the first end portion are respectively taken to be a2, b2, b1 and a1, a relation between the step widths is arranged to satisfy a1=a2>b1=b2, the step position heightening in order of the first to fourth steps respectively having the widths a2, b2, b1 and a1, and the second and third steps having, the widths b2 and b1 existing between the first and fourth steps having the widths a2 and a1. Further, a second end portion of the hologram corresponding to a portion of the peripheral portion of the incident light beam on the hologram and taking the smallest incident angle (receiving the light incident at the smallest angle) is arranged such that, when the widths of first to fourth steps in the second end portion are taken to be a4, b4, b3 and a3, a relation between the step widths is arranged to satisfy a3=a4<b3=b4, the step position heightening in order of the first to fourth steps respectively having the widths a4, b4, b3 and a3, and the second and third steps having the widths b4 and b3 existing between the first and fourth steps having the widths a4 and a3.

Still further, according to this invention, in an optical pickup apparatus comprising a light source for emitting a light beam, a diffraction grating for receiving the light from the light source to dividing it into 3 light beams, a condensing optical system for receiving the 3 light beams from the first diffraction grating to converge them on an information medium, a beam divider for receiving light from the information medium to divide and reflect the light from the information medium, and a photodetector for receiving light from the beam divider to provide information signals, the diffraction grating has a 2-step cross-sectional configuration comprising a higher step and a lower step successively arranged, and the width of the step in the 2-step cross-sectional configuration varies in accordance with a position within a surface of the diffraction grating. Preferably, a first portion of the diffraction grating is arranged such that a ratio of the widths of the higher and lower steps is substantially 1:1 in a grating pitch of the 2-step cross-sectional configuration, and a second portion of the diffraction grating is arranged such that a ratio of the widths of the higher and lower steps is different from 1:1.

BRIEF DESCRIPTION OF THE DRAWINGS

The object and features of the present invention will become more readily apparent from the following detailed description of the preferred embodiments taken in conjunction with the accompanying drawings in which:

FIGS. 7 and 7(a) show a principal portion of the optical pickup head apparatus according to the third embodiment of this invention;

FIGS. 10, 10(a) and 10(b) are cross-sectional views showing an arrangement of a hologram of the optical pickup head apparatus according to the fourth embodiment of this invention;

FIG. 13 is an illustration for describing a conventional method of manufacturing a hologram which is applicable to the hologram according to this invention;

DETAILED DESCRIPTION OF THE INVENTION

Figure 1A:
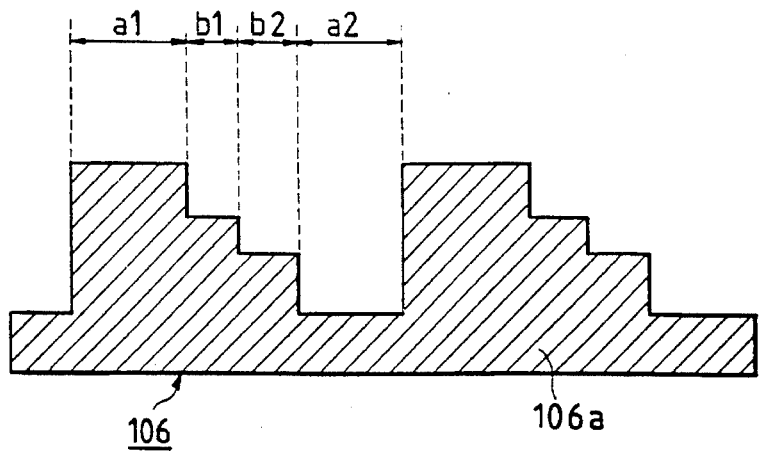
FIGS. 1A and 1B are cross-sectional views showing an arrangement of a blazed hologram according to a first embodiment of this invention.
Figure 1B:
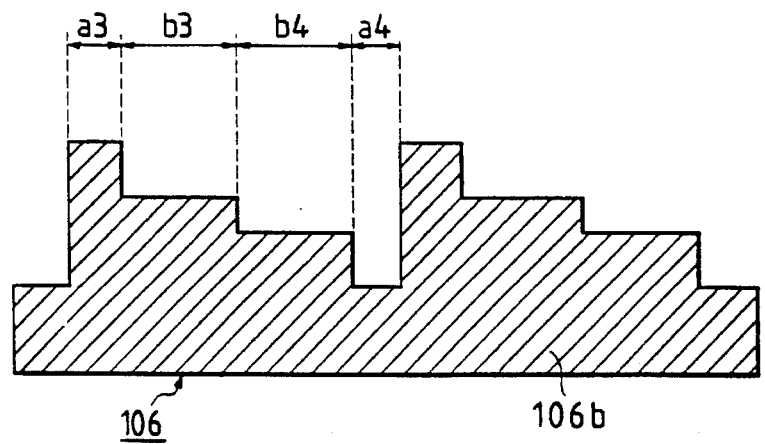
Figure 12:
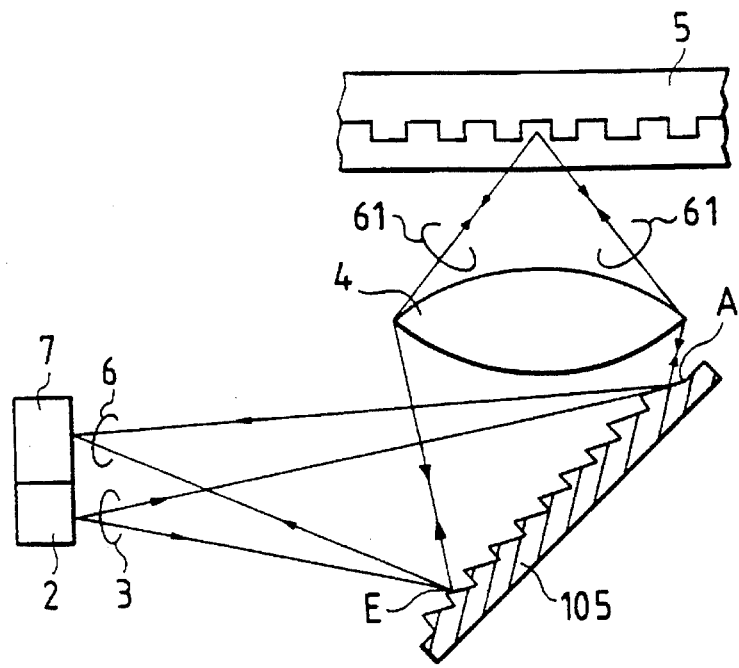
FIG. 12 is a schematic cross-sectional view showing an arrangement of a conventional optical pickup head apparatus.

A description will be made hereinbelow in terms of embodiments of this invention. First, an arrangement of a hologram according to a first embodiment of this invention to be used in an optical apparatus as exemplified in FIG. 12 will be described with reference to FIGS. 1A and 1B. FIGS. 1A and 1B are cross-sectional views showing an arrangement of a hologram 106 according to a first embodiment of this invention, FIG. 1A showing a cross section of the vicinity of a first portion 106a corresponding to the portion indicated at A in FIG. 12 and FIG. 1B showing a cross-section of the vicinity of a second portion 106b corresponding to the portion indicated at E in FIG. 12. In this embodiment, as illustrated in FIG. 12 the outgoing light beam 3 emitted from the light source 2 is reflected on the hologram 105 to be incident on the objective lens 4 to be focused on the information medium 5 and then reflected from the information medium 5 to be incident on the hologram 5 along the same optical path. The +1st order diffraction beam 6 from the hologram 105 is incident on the photodetector 7. As illustrated in FIG. 1A, the first portion 106a which corresponds in position to a portion of the periphery of the light beam incident on the hologram 3 from the objective lens 4 in the return optical path has a stair-like cross section arranged such that, when the widths of first to fourth steps are taken to be a2, b2, b1 and a1, a relation of a1=a2>b1=b2 is satisfied. The step position heightens in order of the first to fourth steps having the widths a2, b2, b1 and a1, and the second and third steps having the widths b2 and b1 exist between the first and fourth steps having the widths a2 and a1. On the other hand, the second portion 106b which corresponds in position to a portion of the periphery of the light beam incident on the hologram 3 from the objective lens 4 in the return optical path has a stair-like cross section arranged such that, when the widths of first to fourth steps are taken to be a4, b4, b3 and a3, a relation of a3=a4<b3=b4 is satisfied. The step position heightens in order of the first to fourth steps having the widths a4, b4, b3 and a3, and the second and third steps having the widths b4 and b3 exist between the first and fourth steps having the widths a4 and a3. The first portion 106a is a portion of the hologram 105 on which the light beam from the objective lens 4 in the return optical path is incident at the largest angle and the second portion 106b is a portion of the hologram 105 on which the light beam from the objective lens 4 in the return optical path is incident at the smallest angle.

An intermediate portion of the hologram between the first and second portions 106a and 106b is arranged to have a cross-section formed by linearly changing the cross-sectional configurations of the first and second portions 106a and 106b. For example, the widths of steps at the vicinity of the incident point of the principal ray are arranged to be substantially equal to each other. More specifically, although a (=a1=a2)>b (b1=b2) at the portion 106a (the portion A), the width a is gradually decreased and width b is gradually increased toward the portion 106b (the portion E) so that a=b at the optical axis position (the incident point of the principal ray).

That is, the ratio of the width of the step relative to the grating pitch is arranged to vary in accordance with the position within the hologram surface.

Figure 2A:
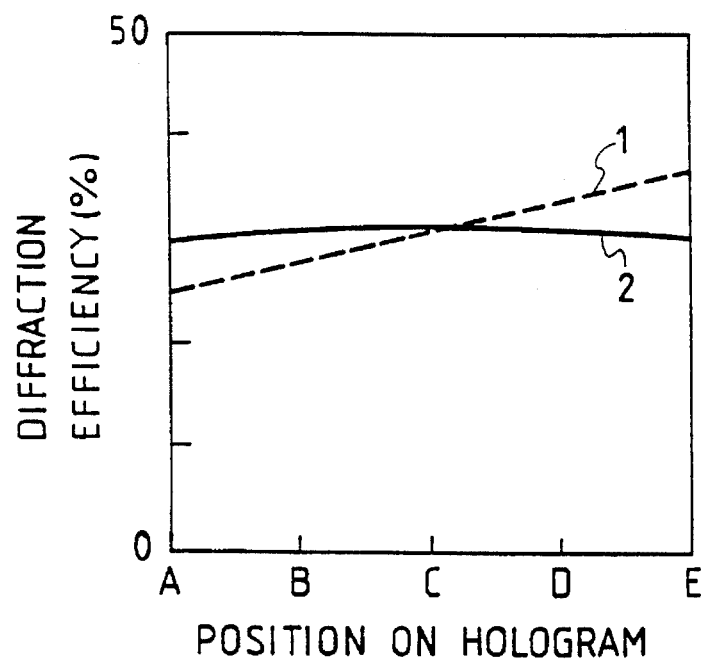
FIG. 2A is a graphic illustration for describing a relation between a diffraction efficiency and a position on the hologram according to the first embodiment of this invention.
Figure 2B:
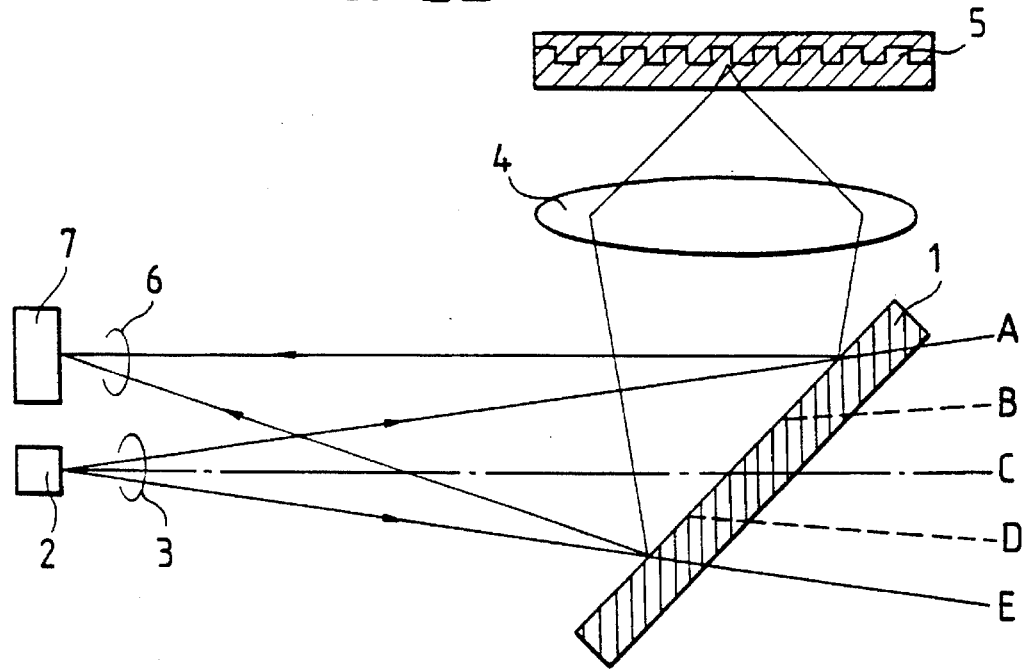
FIG. 2B shows the hologram according to the first embodiment used in an optical pickup head apparatus.
Figure 14:
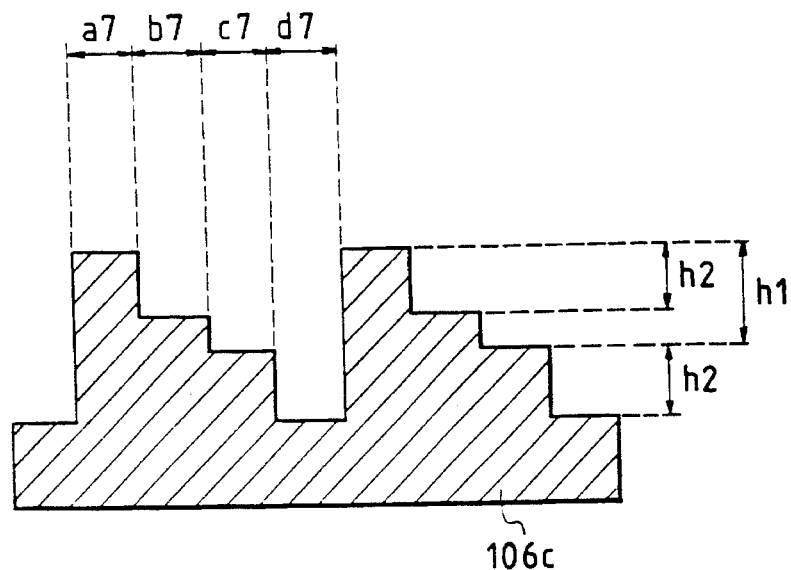
FIG. 14 is a partial cross-sectional view showing an arrangement of a conventional hologram.
Figure 15:
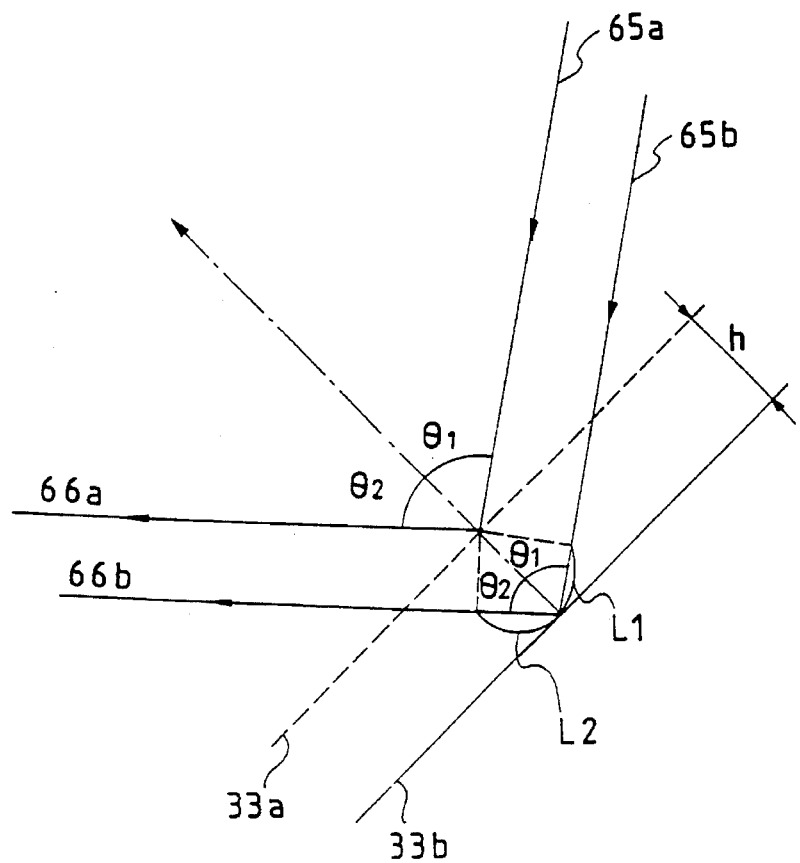
FIG. 15 is an illustration for describing a problem in a conventional optical pickup head apparatus.

With this arrangement, the diffraction efficiency η+1 of the 1st order diffraction beam substantially becomes constant irrespective of positions on the hologram as indicated by a solid line 2 in FIG. 2A showing calculation results where the vertical axis designates the diffraction efficiency and the horizontal axis represents the position on the hologram. This means that the variation of the diffraction efficiency could be removed. The positions A to E on the horizontal axis in FIG. 2A are respectively indicative of the positions A to E on the hologram according to this embodiment in an optical pickup head apparatus shown in FIG. 2B in which parts corresponding to those in FIG. 12 are marked with the same numerals and the hologram according to this embodiment is designated at numeral 1. In FIG. 2A, a dotted line 1 indicates the conventional diffraction efficiency under the condition that the widths of the respective steps of the hologram are arranged to be equal to each other as illustrated in FIG. 14. As clearly seen by the comparison between the solid line 2 and the dotted line 1 in FIG. 2A, the uniformity or stability of the diffraction efficiency of the hologram according to this embodiment can greatly be improved as compared with that of the conventional hologram.

Here, although in the above description the first portion 106a in FIG. 1A (corresponding to the portion A in FIG. 2A or 2B) is arranged to satisfy the relation of a1=a2>b1=b2 and the second portion 106b in FIG. 1B (corresponding to the portion E in FIG. 2A or 2B) is arranged to satisfy the relation of a3=a4<b3=b4, it is also appropriate that the first portion 106a is arranged to satisfy a relation of a1=b1=b2<a2 and the second portion is arranged to satisfy a relation of a3=b3=b4>a4, and the configuration of the intermediate portion between the portions A and B is arranged to linearly vary.

According to this embodiment, since the heights (h1 and h2 in FIG. 13) between steps of the stair-like cross section configuration are kept constant within the hologram surface, the hologram can easily be manufactured in accordance with the manufacturing processes in FIG. 13 only with the line widths of the photomasks 32A and 32B being controlled.

Figure 3:
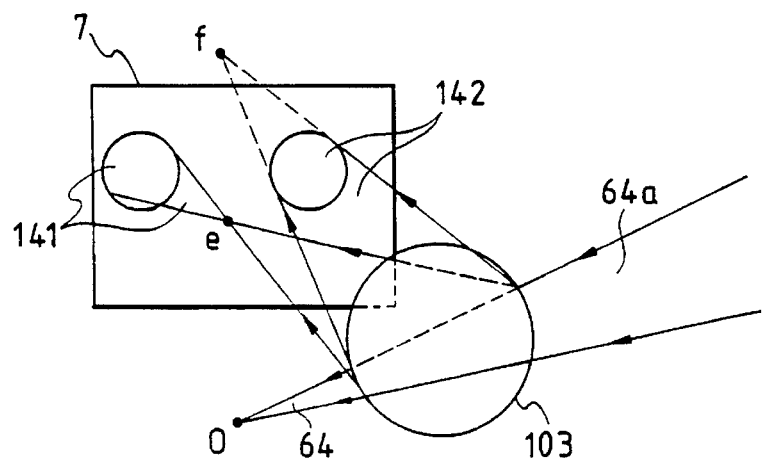
FIG. 3 is a partial view showing a function of a hologram of an optical pickup head apparatus according to a second embodiment of this invention.
Figure 4A:
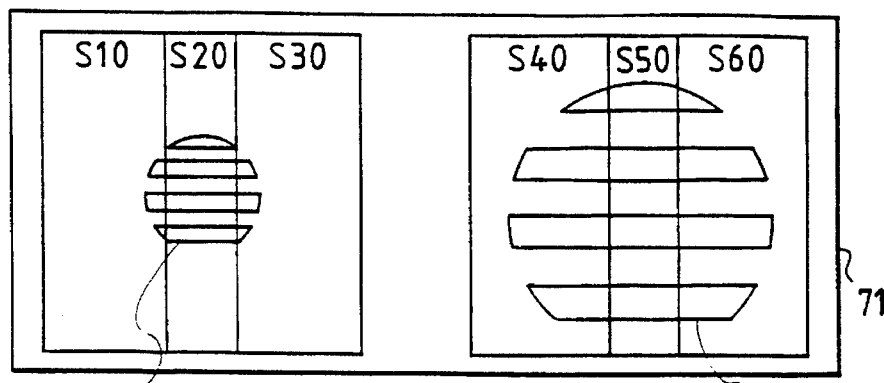
FIGS. 4(a)–(c) are a plan view showing diffraction beams on a photodetector of the optical pickup head apparatus according to the second embodiment of this invention.
Figure 4B:
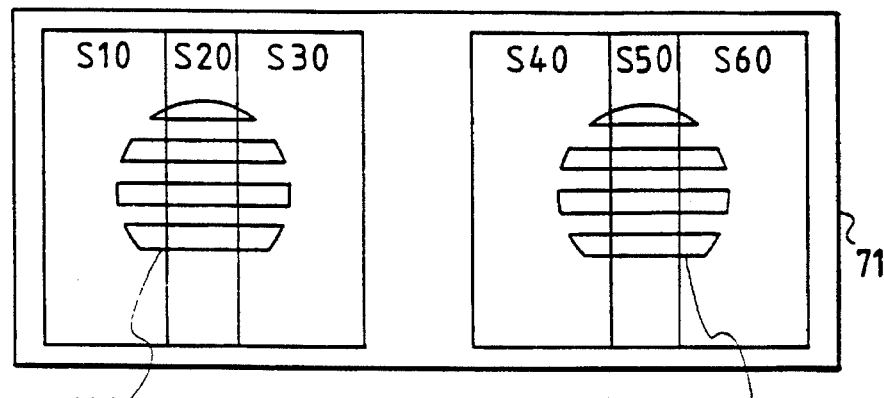
Figure 4C:
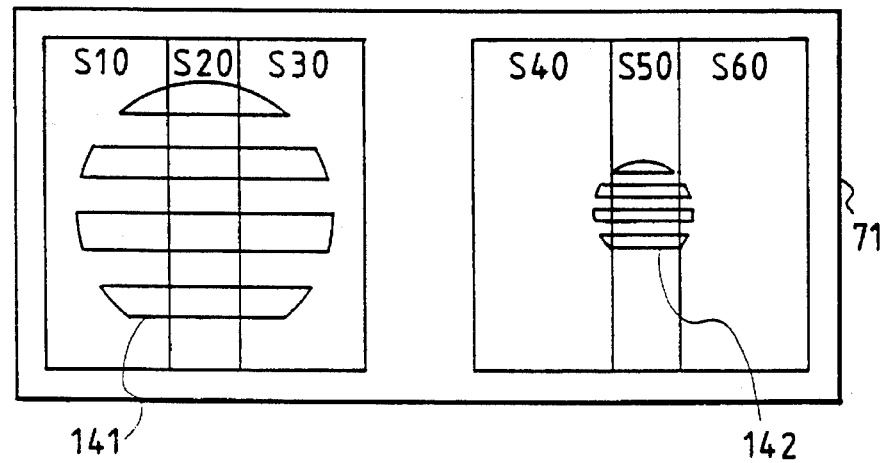

Further, a second embodiment of this invention will be described hereinbelow with reference to FIGS. 3 to 5. This embodiment relates to an optical pickup head apparatus using the hologram according to the first embodiment of this invention, the optical system of the optical pickup head apparatus being basically similar to that of the conventional optical pickup head apparatus shown in FIG. 12. In this embodiment, the detection of the focusing servo signal is based on the spot size detection method (SSD method) such as disclosed in the Japanese Patent Provisional Publication No. 2-185722. This SSD method can considerably loosen the allowable error and stably provide the servo signal irrespective of the wavelength variation. For realizing the SSD method, the +1st order diffraction beams in the return path due to the hologram are arranged to become 2 kinds of spherical waves whose curvatures are different from each other. In addition, the respective spherical waves are designed to have one focal point e at front side of the surface of the photodetector 7 and have the other focal point f at the rear side of the surface of the photodetector 7 as illustrated in FIG. 3. Moreover, as illustrated in FIG. 4, the photodetector 7 comprises a 6-division photodetector 71 which receives the +1st diffraction beams 141 and 142 in the return path due to a hologram 103 in FIG. 3. In FIG. 4, (b) represents the just-focusing state (state in focus) and (a), (c) represent the defocusing states (out-of-focus state). The focusing error signal FE can be given in accordance with the following equation.

$$FE=(S10+S30-S20)-(S40+S60-S50)$$

where S10 to S60 respectively show the outputs of the respective divisions of the 6-division photodetector 71.

In FIG. 3 numeral 64 represents 0 order diffraction light due to the hologram 103 and 64a designates incident light on the hologram 103.

Figure 5:
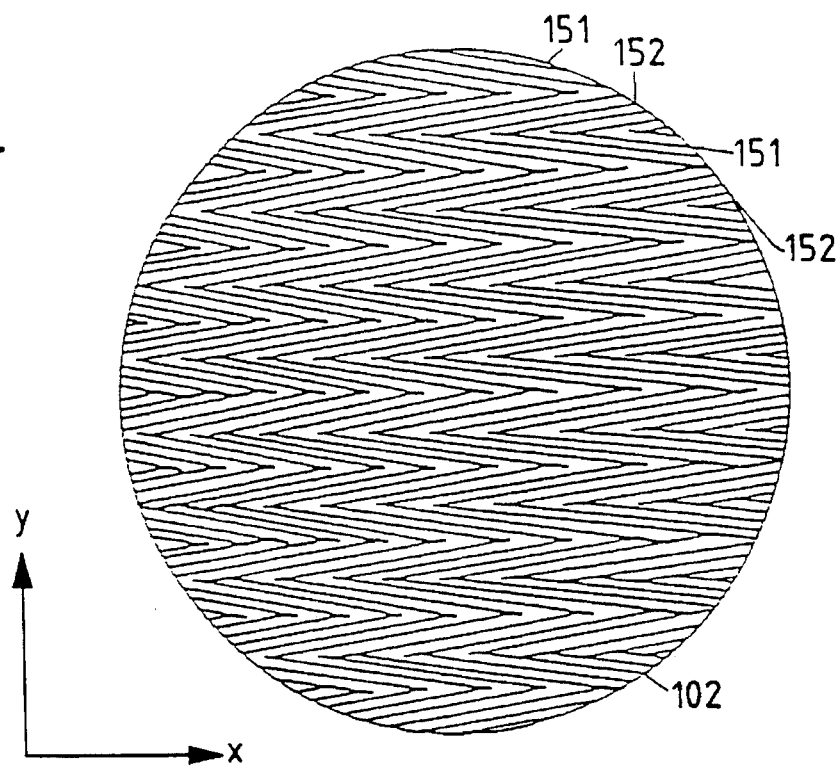
FIG. 5 is a plan view showing a pattern of the hologram of the optical pickup head apparatus according to the second embodiment.

FIG. 5 shows a blazed hologram suitable for the SSD method. In FIG. 5, the hologram 102 includes A and B areas 151 and 152, the A areas 151 being for generating the spherical wave 141 (FIG. 3) which forms the focal point at the front side of the photodetector 71 (FIG. 4) and the B areas 152 being for generating the spherical wave 142 (FIG. 3) which forms the focal point at the rear side of the photodetector 71 (FIG. 4). That is, the A and B areas 151 and 152 are for generating the diffraction beams for the detection of the focusing error signal. Although the far field pattern of the wavefront diffracted by the hologram pattern shown in FIG. 5 is partially broken as illustrated in FIG. 4 because of the division of the hologram pattern, this does not affect the detection of the focusing servo signal.

Here, the light reflected on the information medium 5 has a diffraction pattern because of the track channels formed in the information medium 5, whereby the light quantity distribution on the hologram varies due to the relative positional variation between the condensed (converged) light spot and track channel on the information medium 5. For example, assuming that the x-direction in FIG. 5 is parallel to the track channel of the information medium 5, the brightness can increase in the y-direction and decrease in a direction opposite to the y-direction. Thus, it is preferable that the number of the divisions of the hologram pattern is set to a predetermined value, for example, approximately several divisions to several tens divisions. In this case, i.e., in the case of dividing the hologram area to a large number of portions, the non-symmetrical state between the y-direction and the direction opposite thereto can be cancelled, thereby preventing the generation of offset in the focusing servo signal due to the influence of the light quantity distribution variation on the hologram caused by the relative positional variation between the condensed light spot and track channel on the information medium 5. Accordingly, the multiple division of the hologram area can offer a stable focusing servo characteristic.

Figure 6:
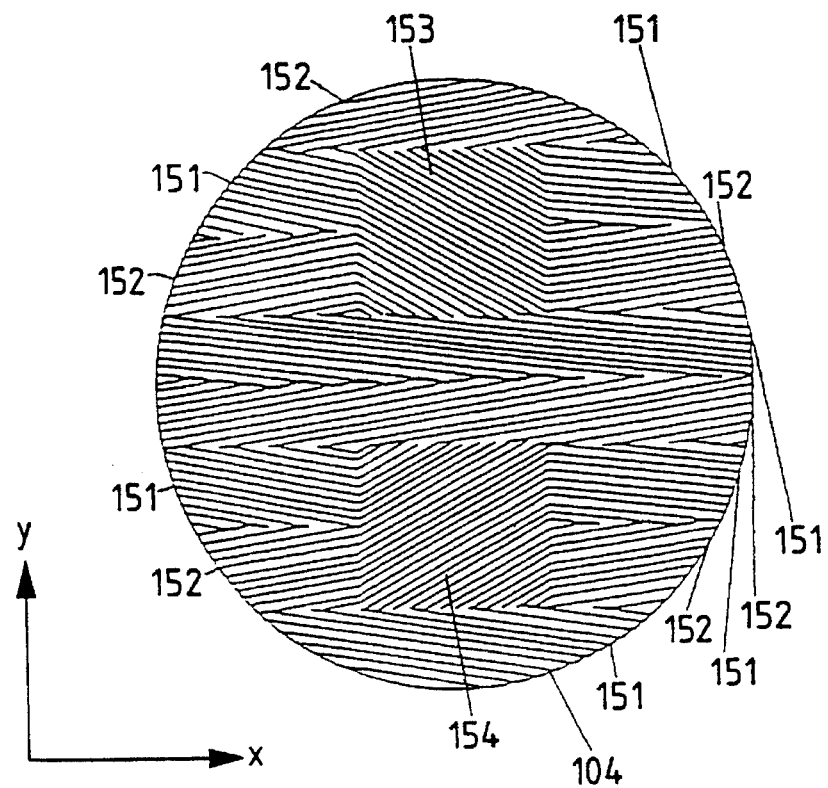
FIG. 6 is a plan view showing a pattern of a hologram of an optical pickup head apparatus according to a third embodiment of this invention.
Figure 7:
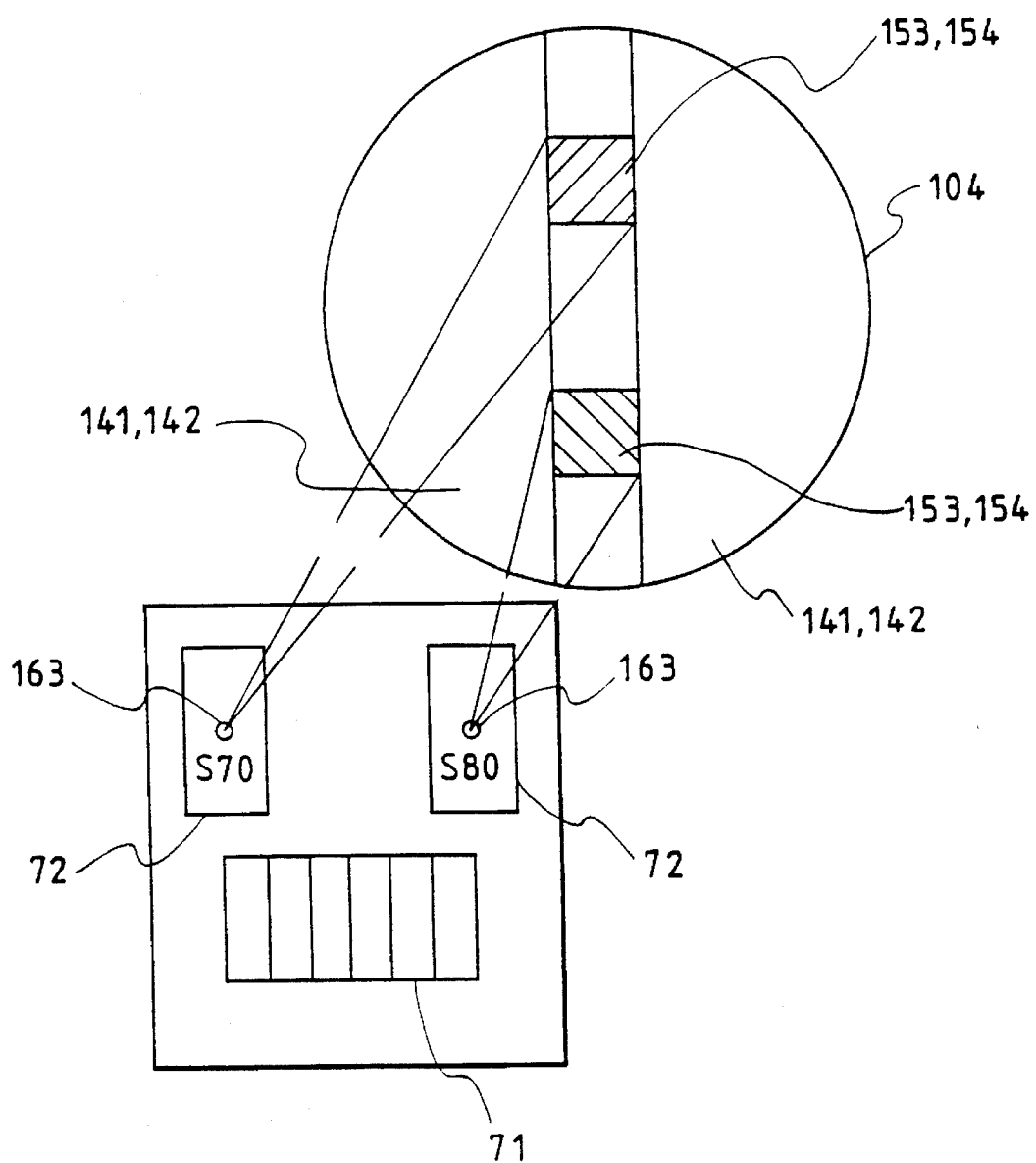

FIG. 6 shows a hologram according to a third embodiment of this invention This embodiment is for obtaining the tracking error signal TE on the basis of the light quantity distribution variation caused by the relative positional variation between the condensed light spot and track channel on the information medium 5. In FIG. 6, the hologram 104 additionally has diffraction areas 153 and 154 for generating diffraction beams. That is, as illustrated in FIG. 7, the diffraction beams 163 are produced by the diffraction areas 153 and 154 and directed to two tracking error detection photodetectors 72 included in the photodetector 7. The tracking error signal TE can be obtained in accordance with the following equation.

$$TE = S70 - S80$$

where S70 and S80 are the outputs of the two tracking error detection photodetectors 72, respectively.

Figure 8:
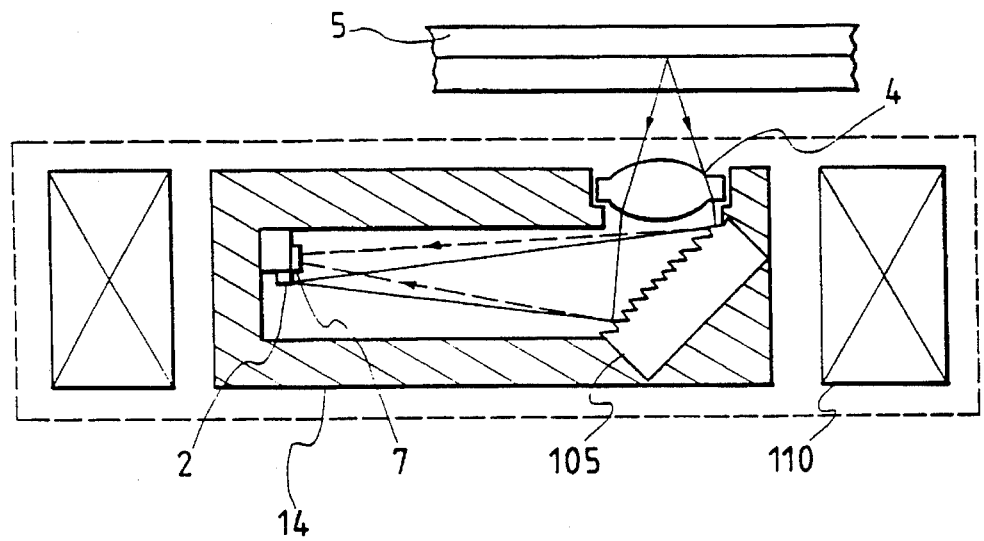
FIG. 8 is a cross-sectional view showing a modification of the arrangement of the optical pickup head apparatus according to the second or third embodiment of this invention.

Here, as shown in FIG. 8, it is appropriate that all optical parts including the light source 2, photodetector 7, reflection type blazed hologram 105 and objective lens 4 are encased in one holder 14 and arranged to be movable together. In FIG. 8, numeral 110 represents an actuator for the movement of the optical parts. In this case, even if the objective lens 4 follows the tracks of the information medium 5, the relative position to the light source 2 does not vary, whereby it is possible to prevent occurrence of the out-of-axis aberration. In addition, because of no occurrence of the out-of-axis aberration, it is possible to reduce the size and thickness of the objective lens 4 for the optical pickup head apparatus size-reduction purposes.

Figure 9:
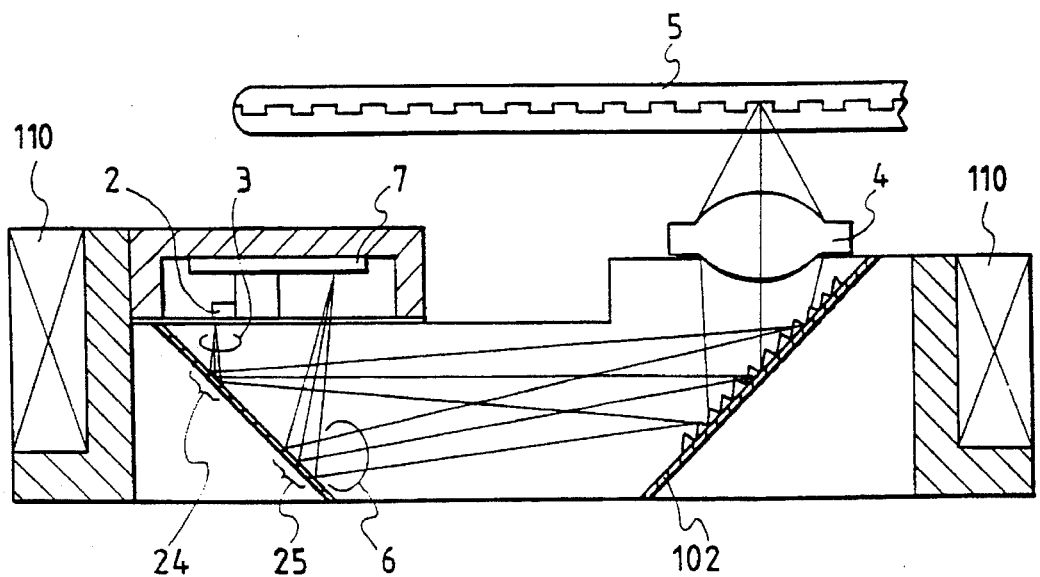
FIG. 9 is a cross-sectional view showing an arrangement of an optical pickup head apparatus according to a fourth embodiment of this invention.
Figure 10:
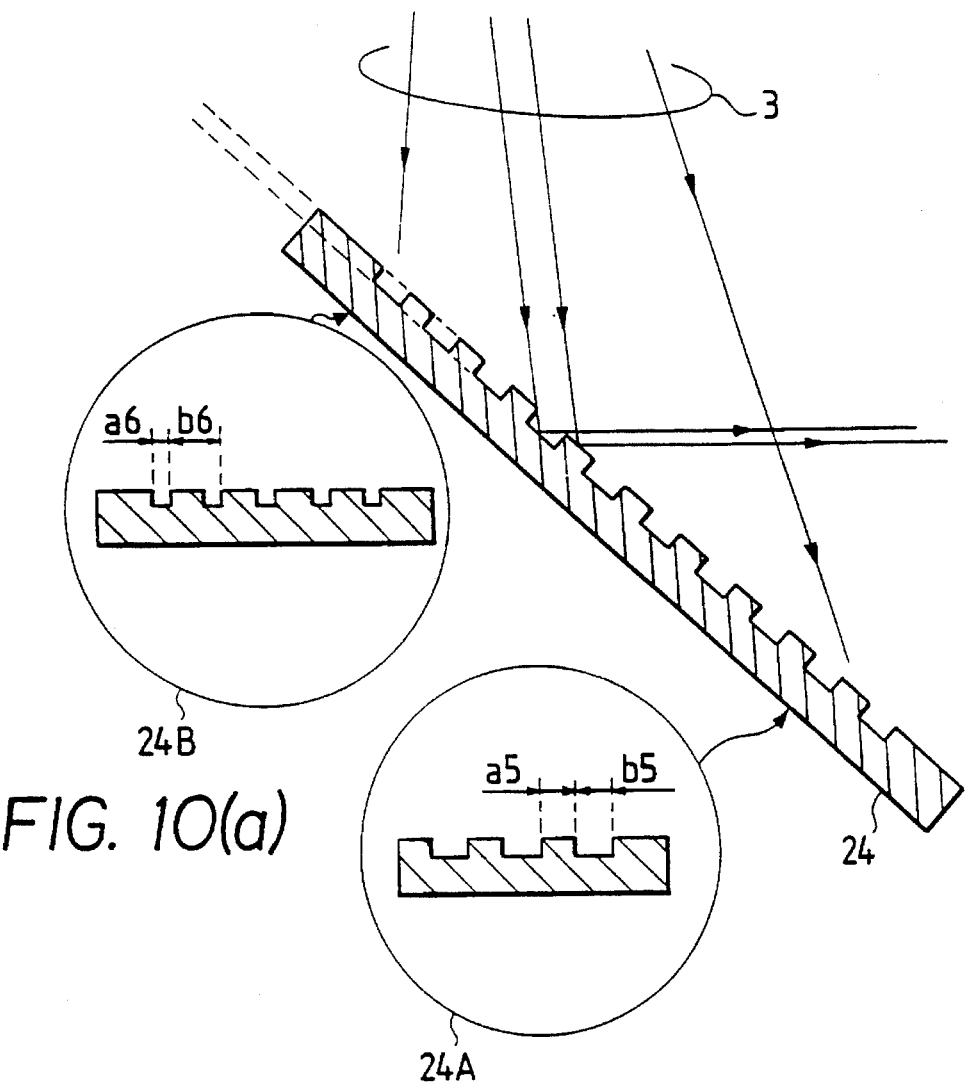

Still further, a description will be made hereinbelow with reference to FIGS. 9 and 10 in terms of a fourth embodiment of this invention. FIG. 9 shows an optical pickup head apparatus based on the tracking error signal detecting method using 3-beams where parts corresponding to those in FIG. 12 are marked with the same numerals. In FIG. 9, numeral 110 is an actuator. One feature of this embodiment is to additionally provide a reflection and 3-beam type diffraction grating (hologram) designated at numeral 24. In FIG. 8, the light emitted from a light source such as a semiconductor 2 is incident on the reflection and 3-beam type diffraction grating 24 so as to be reflected therefrom to be divided into the 0 order diffraction beam and ±1st order diffraction beams. These 3 light beams advance from the reflection and 3-beam type diffraction grating 24 toward a reflection type blazed hologram 102 (similar to the hologram 102 in FIG. 5), then being reflected to be incident on an objective lens 4 to be converged onto an information medium 5. The light reflected on the information medium 5 advance along the same optical paths (return optical paths) and arrive at the hologram 102. The +1st order diffraction beams 6 due to the hologram 102 is reflected on a reflection mirror 25 so as to be incident on a photodetector 7. Thus, it is possible to obtain the servo signals and information signal on the basis of the outputs of the photodetector 7.

In this embodiment, because in the 3 beam method the TE signal is detected on the basis of the +1st order diffraction beam and the −1st order diffraction beam due to the 3-beam type diffraction grating 24, the 3-beam type diffraction grating 24 is not required to be blazed, while for reducing the size of the optical system with the arrangement as shown in FIG. 9 the 3-beam type diffraction grating 24 is required to be of the reflection type and the incident angle of the light beam on the 3-beam type diffraction grating 24 is required to be about 45°, and therefore there is need to remove the variation of the diffraction efficiency. A method to remove the variation of the diffraction efficiency will be described with reference to FIG. 10. FIG. 10 is a schematic enlarged and cross-sectional view showing the 3-beam diffraction grating 24. In this embodiment, the cross section of the 3-beam type diffraction grating 24 is arranged to have a 2-step configuration comprising a higher step and a lower step successively arranged and the portions indicated by 24A and 24B (corresponding in position to portions of the periphery of the incident light beam and having the largest and smallest incident angles, respectively) are arranged to be equal in diffraction efficiency to each other. In the portion indicated by 24A, its cross-sectional configuration is arranged to substantially have a duty of 1:1 in one period (grating pitch) of the 2-step cross-sectional configuration. That is, the width a5 of the higher step is arranged to be substantially equal to the width b5 of the lower step. On the other hand, in the portion indicated by 24B, the duty is arranged to be different from 1:1. That is, in the 2-step cross-sectional configuration, the width a6 of the higher step is greater or smaller than the width b6 of the lower step (a6>b6 or a6<b6). With this arrangement, it is possible to cancel the variation of the diffraction efficiency to obtain a stable tracking error signal with less offset.

Figure 11:
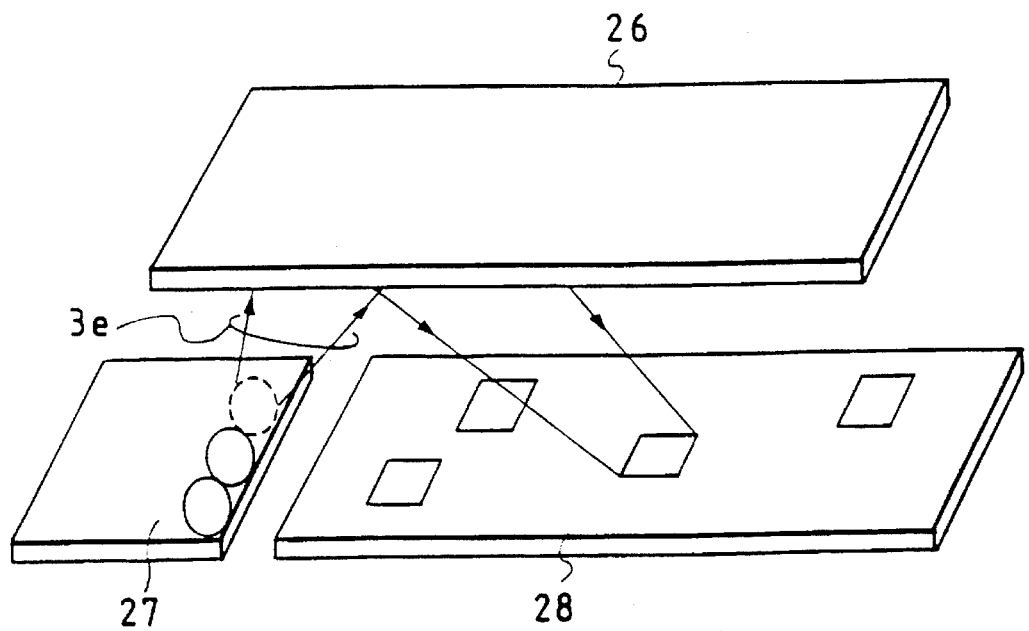
FIG. 11 is a perspective view showing an arrangement of an optical interconnection apparatus according to a fifth embodiment of this invention.

FIG. 11 is a perspective view showing an optical interconnection according to a fifth embodiment of this invention. This optical interconnection is constructed with a hologram. In FIG. 11, numeral 26 represents a hologram, 27 designates a light source array and 28 denotes a photodetector. The light beam 3e emitted from the light source array 28 is diffracted by the hologram 26 so as to be incident on a predetermined division area on the photodetector 28, whereby the intensity or ON.OFF state of the light beam 3e from the light source array 27 is transmitted as a signal to the photodetector 28. Here, although this arrangement can reduce the size of the optical apparatus and make easy the alignment of the optical system, since the divergent light not collimated is incident on the hologram 26, it is required to correct the variation of the diffraction efficiency. Thus, a hologram corresponding to the blazed hologram 106 in the above-described first embodiment is used as the hologram 26 in order to correct the variation of the diffraction efficiency, thereby improving the light transmission efficiency and further improving the S/N ratio of the signal because of suppression of the unnecessary diffraction light.

The effects of this invention are as follows:

1) Since the widths of the steps constituting the stair-like cross-sectional configuration of a multi-level hologram are arranged to be locally different from each other within the hologram surface, it is possible to easily manufacture the hologram which can eliminate the variation of the diffraction efficiency occurring when divergent light is incident on the hologram;

2) Since an optical pickup head apparatus is constructed with a hologram which can eliminate the variation of the diffraction efficiency occurring when divergent light is incident on the hologram, a collimator lens is not required so as to reduce the dimension of the optical pickup head apparatus and the cost, and it is possible to suppress the offset of the focusing error signal or the tracking error signal, thereby providing a high frequency characteristic of the RF signal;

3) In an optical pickup head apparatus using a hologram which can eliminate the variation of the diffraction efficiency occurring in response to incidence of divergent light, since the SSD method is used as the focusing servo signal detection method, it is possible to considerably loosen the allowable error in the assembly of the optical pickup head apparatus concurrently with stably obtaining the servo signal irrespective of the wavelength variation;

4) In an optical pickup head apparatus in which the 3-beam method is used as the tracking error signal detection method, since the diffraction grating is arranged to be of the reflection type the light incident angle is set to be about 45° and the duty of the diffraction grating is arranged to vary, it is possible to reduce the dimension of the optical pickup head apparatus and further to make constant the diffraction efficiency within the 3-beam diffraction grating surface, in other words, it is possible to remove the variation of the diffraction efficiency and further to obtain a stable tracking error signal with less offset; and 5) In an optical interconnection using a hologram, since the variation of the diffraction efficiency of the hologram is corrected, it is possible to reduce the size of its optical system and further to make easy the alignment of the optical system, and it is possible to improve the light transmission efficiency and further to suppress the unnecessary diffraction light to reduce the crosstalk between the signals to improve the S/N ratio.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A diffraction grating having a non-concentric grating pattern, comprising N grating portions having stair-like cross-sectional configurations, each grating portion having M steps arrayed in order of their heights along a grating pitch thereof, where M and N are arbitrary positive integers, wherein a ratio of widths of said M steps constituting each grating portion is differentiated at first and second grating portions Pi and Pj on a surface of said diffraction grating, so as to satisfy the following relation:

$$W(Pi,1):W(Pi,2): \text{- - - -} :W(Pi,k): \text{- - - -} :W(Pi,M) \neq W(Pj,1):W(Pj,2): \text{- - -} :W(Pj,k): \text{- - - -} :W(Pj,M)$$

where $W(Pi,k)$ and $W(Pj,k)$ represent widths of k-th steps in the first and second grating portions Pi and Pj, respectively, i and j are positive integers different from each other and satisfying conditions $1 \leq i \leq N$ and $1 \leq j \leq N$, while k is a positive integer satisfying a condition $1 \leq k \leq M$.

2. The diffraction grating in accordance with claim 1, wherein said diffraction grating has grating portions having first and second steps, respectively, comprising a higher step and a lower step successively arranged, and satisfying the following relation:

$$W(Pi,1):W(Pi,2) \neq W(Pj,1):W(Pj,2)$$

where $W(Pi,1)$ and $W(Pj,1)$ represent widths of said higher steps in said grating portions Pi and Pj, respectively, and $W(Pi,2)$ and $W(Pj,2)$ represent widths of said lower steps in said grating portions Pi and Pj, respectively.

3. The diffraction grating in accordance with claim 2, wherein steps constituting said grating portions Pi and Pj satisfy the following relation:

$$W(Pi,1):W(Pi,2)=1:1$$

$$W(Pj,1):W(Pj,2) \neq 1:1.$$

4. A diffraction grating comprising N grating portions having stair-like cross-sectional configurations, each grating portion having M steps arrayed in order of their heights along a grating pitch thereof, where M and N are arbitrary positive integers, wherein a ratio of widths of said M steps constituting each grating portion is differentiated at 1st and N-th grating portions P1 and PN disposed at two ends of a surface of said diffraction grating, so as to satisfy the following relation:

$$W(P1,1):W(P1,M)=1:1$$

$$W(PN,1):W(PN,M) \neq 1:1$$

where $W(P1,1)$ and $W(PN,1)$ represent widths of first steps, being highest steps, in the grating portions P1 and PN, respectively, and $W(P1,M)$ and $W(PN,M)$ represent widths of Mth steps, being lowest steps, in the grating portions P1 and PN, respectively.

5. A diffraction grating comprising N grating portions having stair-like cross-sectional configurations, each grating portion having M steps arrayed in order of their heights along a grating pitch thereof, where M and N are arbitrary positive integers, wherein a ratio of widths of said M steps constituting each grating portion is differentiated at first and second grating portions Pi and Pj on a surface of said diffraction grating, so as to satisfy the following relation:

$$W(Pi,1):W(Pi,2): \text{- - - -} :W(Pi,k): \text{- - - -} :W(Pi,M) \neq W(Pj,1):W(Pj,2): \text{- - -} :W(Pj,k): \text{- - - -} :W(Pj,M)$$

where $W(Pi,k)$ and $W(Pj,k)$ represent widths of k-th steps in the first and second grating portions Pi and Pj, respectively, i and j are positive integers different from each other and satisfying conditions $1 \leq i \leq N$ and $1 \leq j \leq N$, while k is a positive integer satisfying a condition $1 \leq k \leq M$, and said diffraction grating is a reflection type grating.

6. An optical pickup apparatus comprising:

a light source for emitting a light beam;

a diffraction grating for receiving the light from said light source to divide it into three light beams, said diffraction grating comprising N grating portions each having a stair-like cross-sectional configuration of M steps, where M and N are arbitrary positive integers;

a condensing optical system for receiving said three light beams from said diffraction grating to converge them on an information medium; and a beam divider for receiving light from said information medium to divide the light from said information medium;

wherein a ratio of widths of said M steps constituting each grating portion is differentiated at first and second grating portions Pi and Pj on a surface of said diffraction grating, so as to satisfy the following relation:

$$W(Pi,1):W(Pi,2): \text{- - - -} :W(Pi,k): \text{- - - -} :W(Pi,M) \neq W(Pj,1):W(Pj,2): \text{- - -} :W(Pj,k): \text{- - - -} :W(Pj,M)$$

where $W(Pi,k)$ and $W(Pj,k)$ represent widths of k-th steps in the first and second grating portions Pi and Pj, respectively, i and j are positive integers different from each other and satisfying conditions $1 \leq i \leq N$ and $1 \leq j \leq N$, while k is a positive integer satisfying a condition $1 \leq k \leq M$.

7. The optical pickup apparatus in accordance with claim 6, wherein said diffraction grating has grating portions having first and second steps, respectively comprising a higher step and a lower step successively arranged, and satisfying the following relation:

$$W(P_i,1):W(P_i,2) \neq W(P_j,1):W(P_j,2)$$

where $W(P_i,1)$ and $W(P_j,1)$ represent widths of said higher steps in said grating portions $P_i$ and $P_j$, respectively, and $W(P_i,2)$ and $W(P_j,2)$ represent widths of said lower steps in said grating portions $P_i$ and $P_j$, respectively.

8. The optical pickup apparatus in accordance with claim 6, wherein steps constituting said grating portions $P_i$ and $P_j$ satisfy the following relation:

$$W(P_i,1):W(P_i,2)=1:1$$

$$W(P_j,1):W(P_j,2) \neq 1:1.$$

9. The optical pickup apparatus in accordance with claim 8, wherein said grating portion $P_j$ receives the light beam emitted from said light source at a smaller incident angle, and said grating portion $P_i$ receives the light beam emitted from said light source at a larger incident angle.

10. The optical pickup apparatus in accordance with claim 6, wherein said diffraction grating is a reflection type grating.

11. The optical pickup apparatus in accordance with claim 6, wherein the light reflected from said information medium is led to a hologram to be incident as two first order diffraction beams on a photodetector to obtain information signals, said hologram being arranged so that said two first order diffraction beams form focal points or focal lines at the front and rear sides of said photodetector.

\* \* \* \* \*